US006484239B1

(12) United States Patent
Hill et al.

(10) Patent No.: US 6,484,239 B1
(45) Date of Patent: Nov. 19, 2002

(54) PREFETCH QUEUE

(75) Inventors: David L. Hill, Cornelius, OR (US);
Chinna B. Prudvi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,012

(22) Filed: Dec. 28, 1999

Related U.S. Application Data

(63) Continuation-in-part of application No. 08/999,241, filed on Dec. 29, 1997, now Pat. No. 6,216,208.

(51) Int. Cl.⁷ ............................................. G06F 12/08
(52) U.S. Cl. ..................................... 711/137; 711/213
(58) Field of Search ........................ 711/118, 137, 711/213, 217, 218, 219, 220

(56) References Cited

U.S. PATENT DOCUMENTS 5,093,777 A * 3/1992 Ryan .......................... 395/400
5,586,294 A   12/1996 Goodwin et al. ............ 395/464
5,701,426 A   12/1997 Ryan .......................... 395/403
5,740,399 A    4/1998 Mayfield et al. ............ 395/464
5,761,706 A    6/1998 Kessler et al. .............. 711/118
6,275,918 B1 * 8/2001 Burhy et al. ................ 711/213

OTHER PUBLICATIONS

Palacharla et al, "Evaluating Stream Buffers as a Secondary Cache Replacement", 1994, IEEE, pp. 24–33.
Jouppi et al, "Tradeoffs in Two–Level On–Chip Caching", 1994, IEEE, pp. 34–45.

* cited by examiner

Primary Examiner—Kevin L. Ellis
(74) Attorney, Agent, or Firm—Kenyon & Kenyon

(57) ABSTRACT

A prefetching control system provided for a processor. The prefetching queue may include an arbiter, a cache queue and a prefetch queue. The arbiter issues requests including read requests. Responsive to a read request, the cache queue issues a control signal. The prefetch queue receives the control signal and an address associated with the read request. When the received address is a member of a pattern of read requests from sequential memory locations, the prefetch queue issues a prefetch request to the arbiter.

18 Claims, 4 Drawing Sheets

10

300

1000

PREFETCH QUEUE

RELATED APPLICATIONS

This application is a continuation-in-part of U.S. patent application Ser. No. 08/999,241, entitled "Prefetch Queue," filed Dec. 29, 1997 now U.S. Pat. No. 6,216,208, is incorporated herein by reference and may benefit from the priority thereof.

BACKGROUND OF THE INVENTION

The present invention relates to a prefetch queue provided for an external cache memory in a processor.

Prefetching is a known technique implemented in processor devices. Prefetching causes data or instructions to be read into the processor before it is called for by the processor's core execution unit ("core"). By having the data available within the processor when the core is ready for it, the core need not wait for the data to be read from slower external memories. Instead, the data is available to the core at the relatively higher data rates of internal buses within the processor. Because prefetching can free a core from having to wait for an external bus transaction to be completed before the core can use the requested data, prefetching can improve processor performance.

If implemented incorrectly, however, prefetching can impair processor performance. By reading data from external memories into the processor, prefetch operations occupy resources on the external bus. Due to the limited size of the core cache, prefetching may write data over other data that the processor may use. Further, prefetching may read data into the processor that may never be used. Thus, prefetching is useful only if it improves processor performance more often than it impairs such performance. Instruction streaming, a type of prefetching, occurs when a core causes data to be read sequentially from several adjacent positions in external memory. Instruction streaming suffers from the above disadvantages.

It is known that prefetching may provide significant performance improvements when a processor either executes instructions or manipulates data held in adjacent memory locations. However, no known prefetching scheme adequately distinguishes programs that perform sequential memory reads from those that perform non-sequential memory reads. Further, many processors, particularly out-of-order superscalar machines, tend to perform several interlaced sequential reads "in parallel." They may read data from sequential memory positions in a first area of memory interspersed with reads from sequential memory positions in a second area of memory. Traditional prefetching techniques do not recognize multiple streams of sequential memory reads as appropriate for prefetching.

Accordingly, there is a need in the art for a prefetch scheme that prefetches only when there exists a pattern demonstrating that performance improvements are to be obtained by prefetching. There is a need in the art for a prefetch scheme that incurs low performance costs for erroneous prefetches. Further, there is a need in the art for a prefetch scheme that detects and observes parallel prefetch operations.

SUMMARY OF THE INVENTION

Embodiments of the present invention provide a prefetch queue for an agent that can detect request patterns in both an ascending direction in memory and a descending direction in memory. Having detected a request pattern and a direction, the prefetch queue requests data from a next memory location in the direction.

DETAILED DESCRIPTION

Embodiments of the present invention provide a prefetch queue for an agent that can identify multiple parallel sequential read patterns from a sequence of read requests issued by an agent core. The prefetch queue also may identify read patterns directed to advancing or retreating locations in memory.

Figure 1:
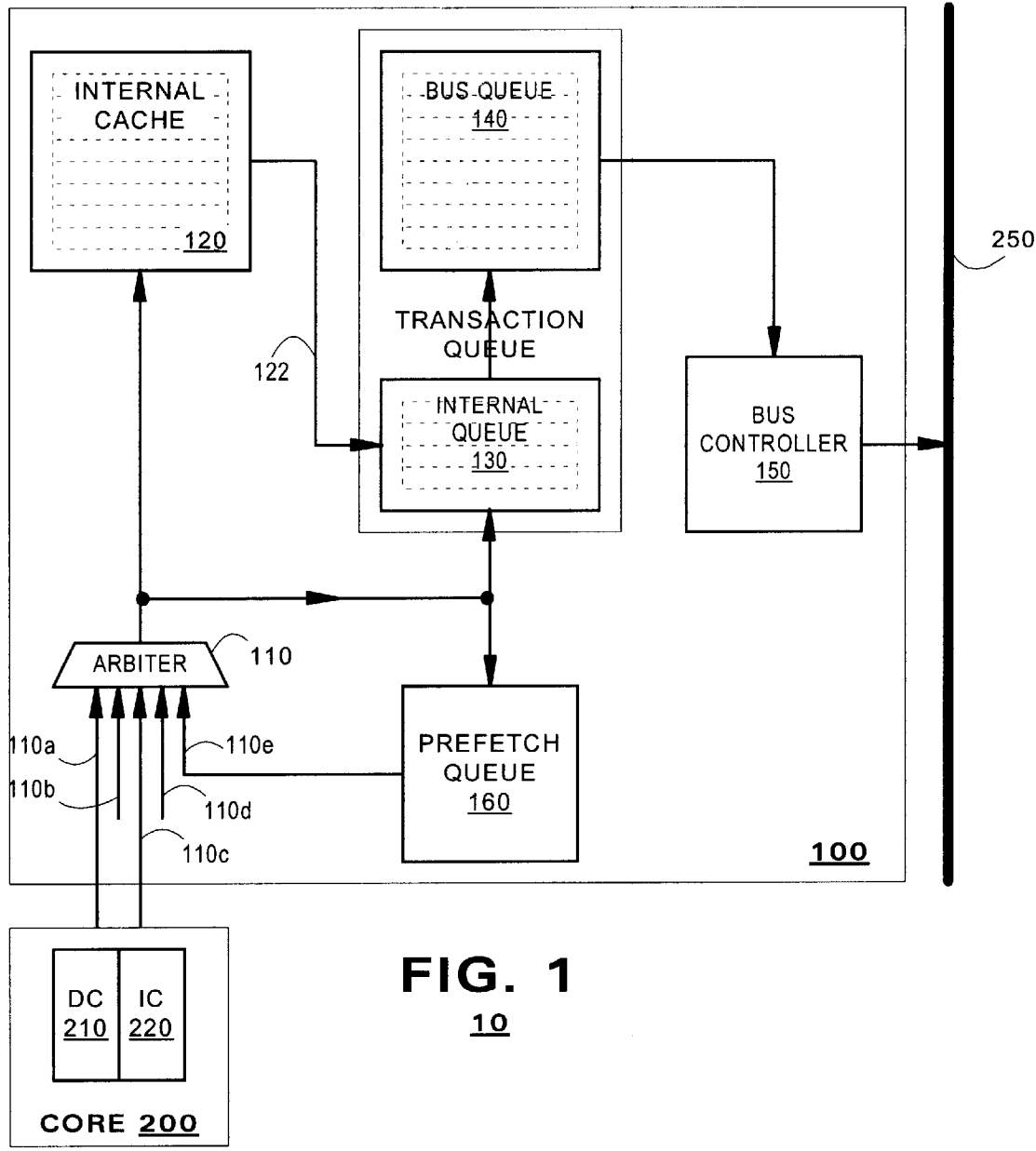
FIG. 1 is block diagram of a processor constructed in accordance with an embodiment of the present invention.

FIG. 1 illustrates an embodiment of a processor 10 constructed in accordance with an embodiment of the present invention. The processor 10 may include a bus sequencing unit 100 ("BSU") and a core 200. Both the BSU 100 and the core 200 may operate at much greater speeds than are associated with an external bus 250. The external bus 250 interconnects the processor 10 with other components such as other processors, memories and other devices (not shown).

BSUs per se are known. They may include an arbiter 110, a cache memory 120, an internal queue 130, a bus queue 140 and an external bus controller 150. The arbiter 110 may receive requests from a variety of inputs 110a–e, such as from the core 200 and perhaps from other sources such as from the bus queue 140 (communication path not shown). Requests may include a request code representing the type of request being made and, where appropriate, an address identifying a memory location to which the request is directed. The arbiter 110 may prioritize the requests and may implement them in the order of priority.

The cache 120 may be an internal memory. As is known, relative to core cache memories (not shown), the cache 120 typically possesses much greater capacity. For example, a typical cache 120 may be a 128 k memory. By contrast a core data cache 210 may be a 32 k memory and a core instruction cache may be an 8 k memory. The cache 120 may be a unified cache, one that stores both instruction data and variable data (collectively, "data").

Read requests from the arbiter 110 may be input to both the cache 120 and to the internal queue 130. The cache 120 may include control logic (not shown) that can determine whether the requested data is stored in the cache 120. If so, the request is said to "hit" the cache 120. The cache 120 will furnish the requested data to the core 200 over a communication path (also not shown). Otherwise, the request is said to "miss" the cache. The cache 120 may communicate a hit or a miss to the internal queue 130 over a line 122.

The internal queue 130 may include control circuitry and buffer memory to process requests from the arbiter 110. The internal queue 130 also receives hit/miss indicators from the cache 120. If a read request hits the cache 120, the internal queue 130 permits the queued request to terminate as it advances out of the queue 130. But if a read request misses the cache 120, the request should be completed by retrieving the requested data from an external memory (not shown). In this case, when the read request advances out of the internal queue 130, the internal queue 130 causes the request to be entered in the bus queue 140.

The bus queue 140 also may include control circuitry and buffer memory. It may cause external bus transactions to be posted on the external bus 250 pursuant to queued requests issued from within the processor. The bus queue 140 may control operation of the bus 250 via an external bus controller 150. Typically, a bus protocol will have been defined for the bus 250, the bus queue 140 and external bus controller 150 may generate and receive signals in accordance with such a protocol.

In an alternate embodiment, the internal queue 130 and bus queue 140 may be replaced by a unitary queue. Accordingly, FIG. 1 illustrates the internal queue 130 and bus queue 140 as included in a single "transaction queue." The principles of the present invention find application with either embodiment.

For a read request, an external bus transaction typically causes data of a predetermined unit size to be read to the processor. For example, a single bus transaction may cause 64 bytes of data to be read to the processor. This predetermined unit size often is referred to as a "cache line." Different systems have different cache line sizes. Thus, although a processor may require data of only a portion of a cache line, the processor may read the entire cache line. From the cache line, the processor will use as much data as is required by its program flow.

An embodiment of the present invention provides a prefetch queue 160 for an agent 10. The prefetch queue 160 may monitor read requests issued by the arbiter 110 and determine whether the read requests exhibit one or more predetermined patterns. If any such pattern is identified, the prefetch queue 160 may issue a read request to be issued (a "prefetch request"). The prefetch request may be made prior to a core request for the same data. Prefetching may contribute to improved processor performance by having data stored in the internal cache 120 prior to the time the core 200 requests the data. If the data is present in the cache 120 when the core 200 needs the data, the core 200 will not be forced to wait for the data to be retrieved via the slower external bus. Instead, the core 200 can use the data immediately.

According to an embodiment of the present invention, the prefetch queue 160 may identify predetermined read patterns from the core 200. In a first embodiment, the prefetch queue 160 may monitor read requests issued by the core 200 to determine whether the requests exhibit a pattern of reads in either a forward or a backward direction or memory (i.e. N, N+1, N+2, . . . or N, N−1, N−2, . . . ). The prefetch queue 160 may detect the direction of sequential reads and orient its prefetch requests to correspond to this direction. For example, the prefetch queue 160 may cause prefetches to occur in an ascending or a descending order of memory address.

According to an embodiment, the prefetch queue 160 may identify sequential reads from a larger series of core requests. A series of sequential reads from memory may be interrupted by read requests directed to other memory addresses. Thus, for example, the prefetch queue 160 may identify a sequential read pattern from the following sequence of core read requests: A, B, A+1, C, A+2. While no sequential read pattern may be established for addresses B or C, a sequential read pattern may be detected beginning at address A. Similarly, the prefetch queue 160 may identify sequential read patterns from a sequence of core read requests directed to the following addresses A, B, A+1, B−1, A+2, B−2. In this example, sequential read patterns exist starting at address A and advancing in a forward direction in memory and also starting at address B and advancing in a backward direction in memory.

According to another embodiment, the prefetch queue 160 may be a multi-mode prefetch queue. In this embodiment, the prefetch queue 160 may operate in a first mode prior to detecting a sequential read pattern at an address. This first mode may require a first threshold number of sequential reads to be detected before the prefetch queue 160 determines to issue a prefetch request directed to a next address in the series. The prefetch queue 160 may operate in a second mode after issuing the prefetch request. In the second mode, the prefetch queue 160 may issue prefetch requests after a second, lower threshold number of sequential reads are detected. In one embodiment, in a second mode, a prefetch request may be issued each time the core requests data to a previously prefetched address.

Figure 2:
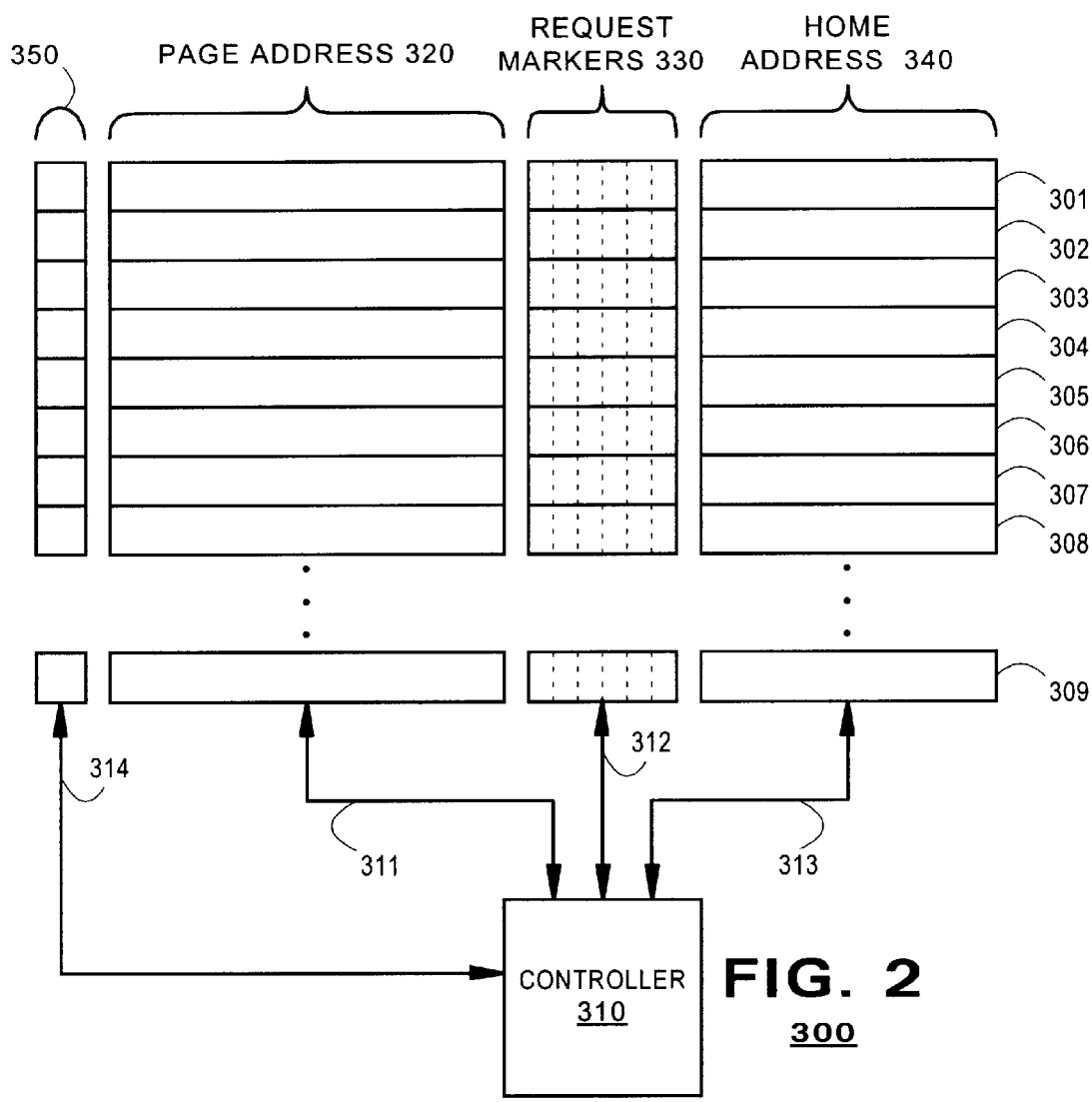
FIG. 2 is a block diagram of a prefetch queue according to an embodiment of the present invention.

FIG. 2 is a block diagram of a prefetch queue 300 according to an embodiment of the present invention. The prefetch queue 300 may be populated by a plurality of queue registers 301–309 and a controller 310. Each of the queue registers 301–309 may include a page ID field 320, a marker field 330, a home address field 340 and a mode identifying flag 350. The page ID field 320 and home address field 340 may include value matching logic that permits a comparison to be made between stored addresses and new addresses input to the prefetch queue 300. Thus, the collection of page ID fields 320 of the registers 301–309 may be considered a "page queue"; the collection of home address fields 340 of the registers may be considered a "home queue."

New addresses may be input to the prefetch queue 300 from the arbiter 110 or the internal queue 130 (FIG. 1). The controller 310 may write data to various portions of the queue registers 301–309 over lines 311, 312 and 313.

As is known, external memory typically is organized into units of a predetermined size called "pages." Memory may be allocated to different uses and applications on a page-by-page basis. Each page may include a predetermined number of cache lines. For example, in a system having 4 kilobyte pages, there may be 64 cache lines of 64 bytes each. In other systems, pages and cache lines may be defined to other sizes. For the purposes of this discussion, it suffices to note that an external memory address may include a portions that identify pages and cache line positions of the address.

Within the prefetch cache 300, page ID portions 320 and home address portions 340 of the registers 301–309 may store predetermined portions of the addresses of read requests received from the BSU 100. When an address is stored in a register (say, register 301) the portion that identifies the address's page may be stored in the page ID portion 320 and the portion that identifies the position of the cache line internally to the page may be stored in the home address portion 340.

The marker field 330 in each register 301–309 may maintain a record of past core requests that were directed to locations at or near the home address. If a core request matches the page address stored in a register and is directed to a location that is sufficiently close to the home address, then a flag may be marked. A sequential read pattern may be detected based upon the content of the marker field 330 of a register.

The prefetch queue 300 also may include a mode identifying flag 350 for each register 301–309 identifying whether the address stored therein is part of a sequential read pattern. Thus, the mode identifying flag 350 may distinguish addresses that are part of active prefetches from those addresses where the prefetch queue 300 is merely searching for a read pattern.

Figure 3:
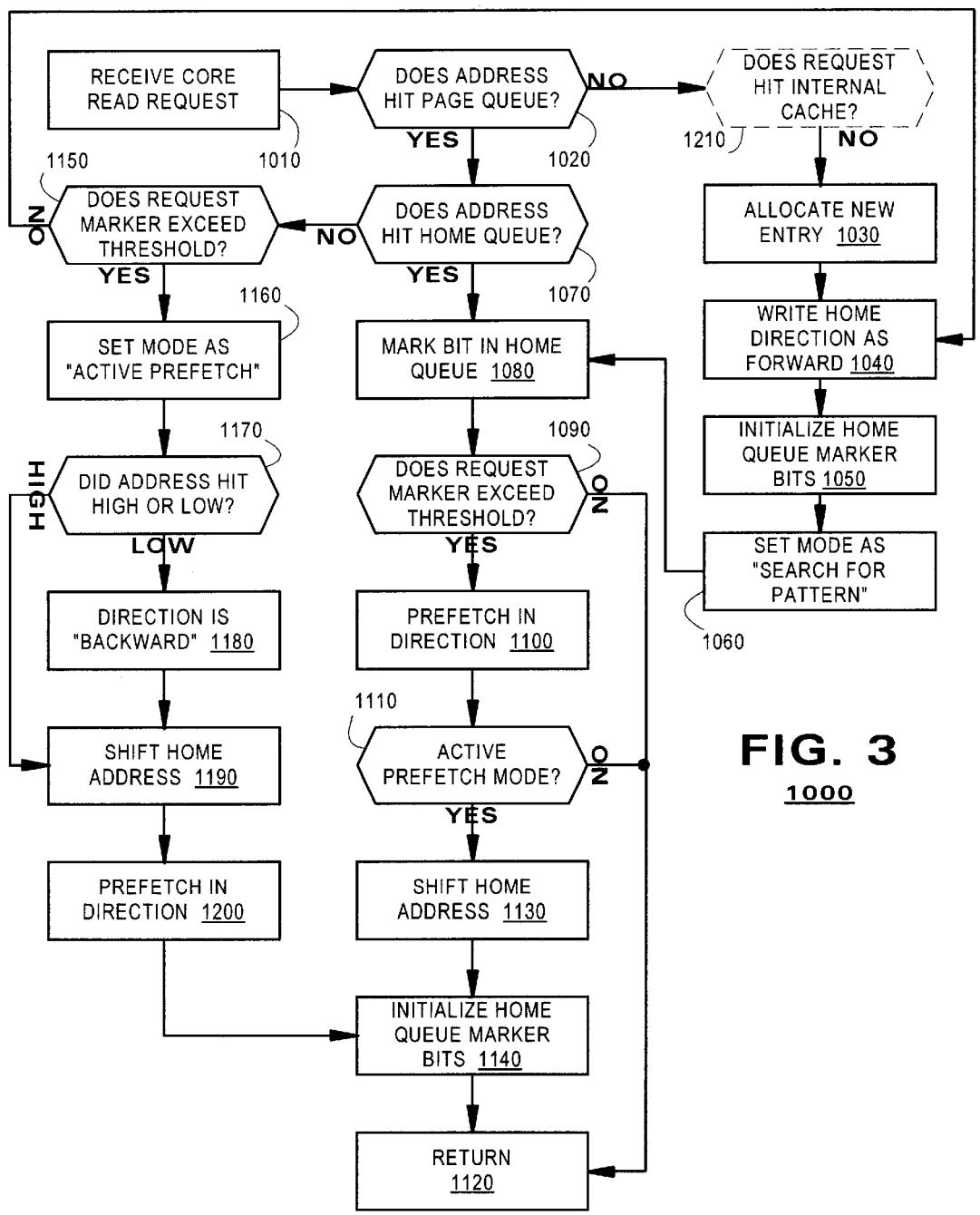
FIG. 3 is a flow diagram of a method of operation of the prefetch queue in accordance with an embodiment of the present invention.

FIG. 3 is a flow diagram of a prefetch control method 1000 according to an embodiment of the present invention. The method 1000 may begin when the prefetch queue receives a read request (Step 1010). Upon receipt, the method 1000 may determine whether the address of the read request coincides with any page addresses stored previously in the prefetch queue (Step 1020). If not, the read request misses the prefetch queue. No request pattern will be identified.

When a received address misses the prefetch queue, the prefetch queue stores data from the newly received request in the queue. The prefetch queue may allocate a register and write the page address and cache address portions of the received address into respective page and home address portions of the allocated register speculatively (Step 1030). The prefetch queue may identify a prefetch direction as forward (Step 1040). The prefetch queue also may initialize the flag portion of the allocated register speculatively (Step 1050). Further, the prefetch queue may indicate that no prefetch pattern has been identified for the newly stored address (Step 1060).

If, at Step 1020, the newly received address hit the page queue, the prefetch queue determines whether the address falls within a predetermined range of the address stored in the home address field of the matching register (Step 1070). If so, the prefetch queue marks a corresponding flag in the marker field (Step 1080). The prefetch queue may determine whether the number of flags in the marker field exceeds a threshold number (Step 1090). If so, the prefetch queue may issue a prefetch request (Step 1100). The prefetch queue also may determine whether the matching register, the register that caused the match with the newly received address, has been marked as operating in an active prefetch mode (Step 1110). If not, the prefetch queue may conclude the method for a present iteration of processing (Step 1120). The prefetch queue also may conclude the method if, at step 1090, it was determined that the number of flags did not exceed the threshold number.

If the prefetch queue is operating in an active prefetch mode, the prefetch queue may shift the home address (Step 1130). This simply may require that a home address portion of the newly issued prefetch be written to the home address field of the matching register. The prefetch queue also may reinitialize the marker field, clearing all flags except the flag corresponding to the home address itself (Step 1140). Thereafter, the current iteration of the method may conclude (Step 1120).

At step 1070, if the newly received address does not match the home address field, the prefetch queue determines whether the number of flags in the marker field of the matching register exceeds a threshold (Step 1150). If so, the prefetch queue may set the mode to "active prefetch" (Step 1160). The prefetch queue also may determine whether the home address portion of the newly received address is higher or lower than the address stored in the home address portion of the matching register (Step 1170). If lower, the prefetch queue changes the prefetch direction to backward (Step 1180). Otherwise, the default direction may remain. Thereafter, the prefetch queue may write the newly received address to the home address field and prefetch ahead of the new home address (Steps 1190–1200). The method may reinitialize the marker field (Step 1140) and conclude.

If, at step 1150, the number of flags does not exceed the threshold, the prefetch queue may advance to step 1040, write the home address portion in the home address field of the register, reinitialize the marker field and set the mode as "search for pattern."

In an embodiment, the controller 310 of FIG. 2 may cause the prefetch queue 300 to implement the method 1000 described above.

In another embodiment, the prefetch queue may operate the method 1000 independently for each register 301–309. Thus, a first register 301 may be designated as operating in a "search for pattern" mode while a second register 302 may be operating in an active "prefetch mode." This independence permits the prefetch queue 300 to detect multiple independent read sequences from the core even if the core read requests from the sequence are interspersed with other requests that are not in the sequence. This property permits the prefetch queue to acquire multiple independent read sequences from the core.

Optionally, the method 1000 may be tailored to address certain boundary conditions that may arise during operation. For example, following step 1150, if the number of flags does not exceed the threshold, the prefetch queue may determine if the request hit the internal cache 120 (FIG. 1). If not, it represents a likely synchronization error between the core and the prefetch queue. In response the prefetch may advance to step 1040 and reset the matching register. Otherwise, it may advance to step 1120 as shown in FIG. 3.

In an embodiment, the prefetch queue may condition operation of steps 1030–1060 on whether the read request hit the internal cache 120 (Step 1210). In such an embodiment, if the request hits the internal cache, the method 1000 may conclude (step not shown). Otherwise, steps 1030–1060 would be performed.

Figure 4:
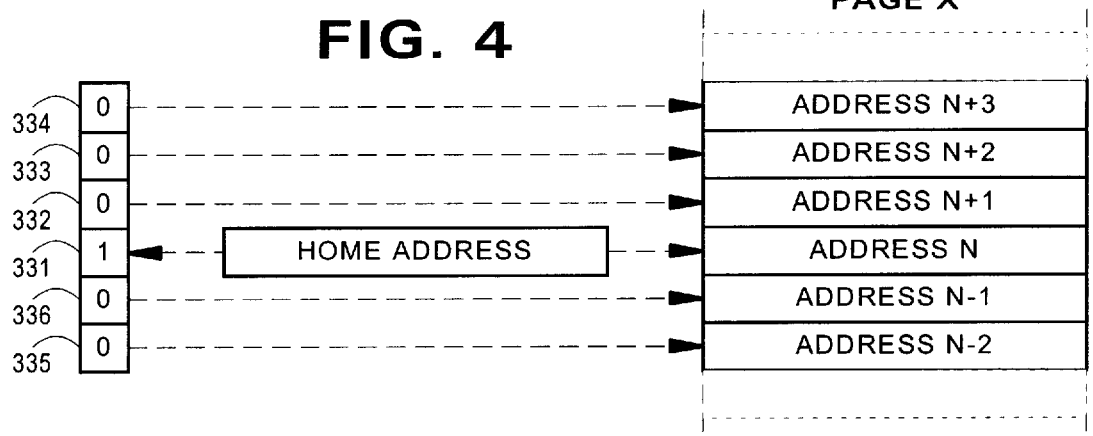
FIG. 4 illustrates relationships between a home address, the flags and external memory locations.

FIG. 4 illustrates relationships that may be established between the home address, the flags and external memory locations according to an embodiment of the present invention. As described, the home address portion of a register identifies a cache-line-aligned address within a page in external memory. Thus, as shown in FIG. 4, the home address may refer to a cache-aligned address N in a page X of external memory. The home address may correspond to a base position 331 in the marker field 330 of the register. Flag positions 332–336 adjacent to the base position 331 may correspond to external memory addresses adjacent to the address N. Thus, the prefetch queue may record core read requests directed to a window of external memory having a width defined by the width of the marker field 300.

Consider the prefetch queue in operation with respect to a sequence of core requests beginning at an address A. When the first address in the sequence is input to the prefetch queue, the prefetch queue may traverse steps 1030–1060 and write the newly received address to a new queue entry. Thereafter, the core may issue further requests in the sequence that cause flags to be set in the marker field (Step 1080) but are insufficient to raise the total number of flags to pass the threshold of step 1090. For example, if the threshold were set to three, a core request to address A+1 would cause the threshold test to fail. The prefetch queue would perform steps 1070–1090 and conclude.

Eventually, the core may issue enough requests to pass the threshold of step 1090. Using the above example, when the prefetch queue receives a core request to address A+2, a third bit may be set in the marker field. The flags may pass the threshold of Step 1090 and the prefetch queue may issue a prefetch request. In this iteration, the prefetch queue may prefetch an address at A+4. This is appropriate because the core read request to A+2, by virtue of an associated blind prefetch, may cause data at addresses A+2 and A+3 to be read to the agent. After the prefetch, however, because the prefetch queue has not advanced to active prefetch mode, the prefetch queue would conclude the present iteration of the method.

When the prefetch queue receives a core request to address A+3, the prefetch queue again may progress through steps 1070–1110. The prefetch queue may issue a prefetch request to address A+5. Because data at address A+5 may have been read to the agent as part of a blind prefetch associated with the prefetch request A+4, the prefetch request may hit the internal cache 120 (FIG. 1). It need not generate an external bus transaction.

When the prefetch queue receives a core read request to address A+4, the address may hit the page queue but miss the home address queue. In this case, the prefetch queue may advance through steps 1150–1190. The prefetch queue switches modes (to active prefetch mode) and determines the prefetch direction. In this example, the direction does not change; it remains designated as "forward." The prefetch queue also writes A+4 to the home address and prefetches based upon it. In this example, the prefetch queue prefetches to address A+6. Thereafter, additional core read requests in the sequence may cause the prefetch queue to traverse steps 1070–1140.

According to an embodiment, the method 1000 may employ a different threshold at step 1090 when the marker field of a register indicates that the prefetch queue is searching for a pattern than when the marker field indicates that an active prefetch is underway. In the example above, three flags were required for a first prefetch to be made.

When an active prefetch is underway, it may be appropriate to lower the required number of flags. Thus, using the foregoing example, the threshold may be dropped to one. This would cause a prefetch to be issued every time a new core request "touched" the marker field.

According to another embodiment, the method 1000 may test only a portion of the marker field during an active prefetch. As shown in FIG. 4, the marker field records core reads to external memory locations that surround the home address. When an active prefetch is underway, a prefetch direction is known to be forward or backward. According to this embodiment, when an active prefetch is underway, step 1090 may test only that portion of the marker field that is associated with the prefetch direction. For forward direction prefetches, the method 1000 may restrict its threshold test only to those field positions from the base address to the front of the marker field (Positions 331–334 in FIG. 4). For backward direction prefetches, the method 1000 may restrict its threshold test only to those field positions toward the back of the marker field (Positions 331–332 and 335–336 in FIG. 4).

According to a further embodiment, the method 1000 may prefetch two cache lines ahead of the newly received address that caused the prefetch. Such an embodiment is appropriate for use with systems that augment the prefetch request to with a blind prefetch to an adjacent memory location (reading data three cache lines ahead of the newly received address).

The discussion of the foregoing embodiments presents the prefetch queue operating in a physical address space, where external memory locations are addressed by page and cache line locations. Note that the principles of the present invention transcend this specific embodiment. The prefetch queue may be applied to other embodiments using other addressing schemes. For example, the prefetch queue may be applied to a virtual address space where memory is addressed by an object identifier and an offset representing a location within memory. Such an embodiment would include an object ID queue in place of a page queue and an offset queue instead of a home queue. Notwithstanding these modifications, the principles of the present invention find application in such a scheme.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A prefetch queue, comprising:
    a plurality of registers, the registers including
        a page address portion,
        a home address portion,
        a marker field, populated by a plurality of flag entries,
            a flag entry in an intermediate position of the field relating to a memory location specified by the contents of the page and home address portions, and
    a controller.

2. The prefetch queue of claim 1, wherein the controller:
    compares a newly received address against contents of the page address portions of the registers, and upon a match, compares the newly received address against contents of the home address portion of a matching register, and when the newly received address differs from the contents of the home address portion of the matching register by a predetermined amount, determining whether a number of flags set in the marker field exceeds a predetermined threshold, if the number of flags exceeds the predetermined threshold, identifying a prefetch direction based upon a difference between the newly received address and the contents of the home address portion of the matching register.

3. The prefetch queue of claim 1, wherein the controller:

compares a newly received address against contents of the page address portions of the registers, and in the absence of a match, stores portions of the address in page address portion and home address portion of one of the registers.

4. The prefetch queue of claim 1, wherein the controller:

compares a newly received address against contents of the page address portions of the registers, and upon a match, compares the newly received address against contents of the home address portion of a matching register, and when the newly received address differs from the contents of the home address portion of the matching register by a predetermined amount, storing a portion of the newly received address in the home address portion of the matching register and clearing the flag portion thereof.

5. The prefetch queue of claim 1, wherein the controller:

compares a newly received address against contents of the page address portions of the registers, and upon a match, compares the newly received address against contents of the home address portion of a matching register, and marks a flag in the flag portion of the matching register corresponding to a proximity between the newly received address and the address stored in the matching register.

6. The prefetch queue of claim 5, wherein, if a number of flags exceed a predetermined threshold, the controller further causes a prefetch request to be made to a next memory address.

7. A processor, comprising:

a processor core, and a bus interface unit, comprising:

an arbiter in communication with the processor core, an internal cache in communication with the arbiter, a transaction queue in communication with the arbiter, and the prefetch queue of claim 1 in communication with the arbiter.

8. A processor, comprising:

a processor core, a bus interface unit, comprising:

an arbiter in communication with the processor core, an internal cache in communication with the arbiter, a transaction queue in communication with the arbiter, and a prefetch queue in communication with the arbiter, comprising a plurality of registers, the registers including a page address portion, a home address portion and a flag portion, and a controller that compares the page address of a newly received address from a core read request against the contents of the page address portions of the registers, and upon a match, compares the home address of the newly received address against the contents of the home address portion of a matching register, and marks a flag in the flag portion of the matching register corresponding to a proximity between the home address of the newly received address and the home address portion of the matching register.

9. The processor of claim 8, wherein, if a number of flags exceed a first predetermined threshold, the controller further causes a prefetch request to be made to a next memory address.

10. The processor of claim 8, wherein the controller:

compares the page address of a newly received address from a core read request against the contents of the page address portion of the register, and in the absence of a match, stores portions of the address in page address portion and home address portion of one of the registers.

11. The processor of claim 8, wherein the controller:

compares the page address of a newly received address from a core read request against the contents of the page address portions of the registers, and upon a match, compares the home address of the newly received address against the contents of the home address portions of a matching register, and when the home address of the newly received address differs from the contents of the home address portion of the matching register, storing the home address of the newly received address in the home address portion of the matching register and clearing the flag portion thereof.

12. A prefetch queue, comprising a plurality of registers, the registers comprising:

fields for page addresses and for home addresses of stored requests, and an additional marker field populated by a plurality of flag positions, a base flag position corresponding to a memory address identified by data stored in the page address and home address fields and flag positions neighboring the base flag position corresponding to external memory addresses neighboring the memory address identified by data stored in the page address and home address fields.

13. The prefetch queue of claim 12, wherein the registers each further comprise a direction flag identifying a prefetch direction established for the respective register.

14. The prefetch queue of claim 12, wherein the registers each further comprise a mode flag identifying whether the address stored in respective register is subject to an active prefetch.

15. A prefetching method comprising:

comparing a newly received address to stored addresses of previous requests, when there is a match between page address portions of a new address and a stored address, determining a count value associated with the stored address, prefetching data when the count value exceeds a predetermined threshold, and when page address portions of the addresses match and home address portions of the addresses differ by a predetermined amount, determining a prefetch direction from a difference of the home address portions.

16. A multimode prefetching method comprising, during a pattern of requests to related memory addresses:

upon a first request in the pattern, storing an address of the request, for subsequent requests, identifying a request as a member of a pattern based upon a match between a page address portion of the stored address and a corresponding portion of an address of the subsequent requests, when a match occurs, storing identifiers of the occurrences, when a first threshold number of occurrences is reached, prefetching data, and thereafter, prefetching data when a second threshold number of occurrences is reached, wherein the first threshold is greater than the second threshold.

17. A multimode prefetching method, comprising, responsive to a newly-received address:

comparing a page address portion and a cache line identifying portion of a new address match to corresponding portions of stored addresses, on a page address match, determining a number of previously-received requests that occurred within a predetermined range of the matching address and, with respect to the matching address:

if the number of prior requests exceeds a predetermined threshold, prefetching an address related to the matching address in a prefetch direction, and if a prefetch mode identifier indicates an active prefetch state, then storing the cache line identifying portion of the new address over a corresponding portion of the matching address;

if the number of prior requests exceeds the threshold and there was no match between the cache portions of the new address and the matching address, storing a prefetch direction identifier generated from a comparison of the cache line identifying portions of the new address and the matching address, and setting a prefetch mode identifier to indicate an active prefetch;

if the number of prior requests does not exceed the threshold and there was no match between the cache line portions of the new address and the matching address, then storing the cache line portion of the new address over the corresponding portion of the matching address, and setting a prefetch mode identifier to indicate a non-active prefetch state; and on a page address miss, storing the new address in association with a mode identifier that indicates a non-active prefetch state.

18. A prefetching method, comprising, when a new address is received:

when a high order portion of the new address matches a corresponding portion of a stored address associated with a prior request, determining whether a lower order portion of the addresses match within a predetermined range, and counting a number of occurrences of matches within the range between the stored address and previously received addresses, when the number exceeds a predetermined threshold, prefetching data at an address derived from the stored address, and when the number exceeds the threshold and the lower order portions do not match, storing the new address over the stored address.

* * * * *